(12) United States Patent
Quine

(10) Patent No.: US 7,191,222 B2
(45) Date of Patent: *Mar. 13, 2007

(54) METHOD FOR PROVIDING ADDRESS CHANGE NOTIFICATION IN AN ELECTRONIC MESSAGE FORWARDING SYSTEM

(75) Inventor: Douglas B. Quine, Bethel, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/332,579

(22) Filed: Jan. 13, 2006

(65) Prior Publication Data

US 2006/0123094 A1   Jun. 8, 2006

Related U.S. Application Data

(63) Continuation of application No. 09/994,357, filed on Nov. 26, 2001, now Pat. No. 6,988,129.

(51) Int. Cl.
G06F 15/173 (2006.01)
(52) U.S. Cl. ............... 709/206; 709/219; 713/170; 705/76
(58) Field of Classification Search ........... 709/206, 709/203, 224, 225, 245, 219; 707/100, 102; 706/45–48; 705/76; 713/170
See application file for complete search history.

(56) References Cited

U.S. PATENT DOCUMENTS

| | | | |
|---|---|---|---|
| 6,654,789 B1 | 11/2003 | Bliss et al. | |
| 6,868,436 B1* | 3/2005 | Fleming, III | 709/206 |
| 6,874,023 B1* | 3/2005 | Pennell et al. | 709/224 |
| 6,988,129 B2* | 1/2006 | Quine | 709/206 |
| 6,990,513 B2* | 1/2006 | Belfiore et al. | 709/203 |
| 6,996,606 B2* | 2/2006 | Hasegawa | 709/206 |
| 2005/0076110 A1* | 4/2005 | Mathew et al. | 709/223 |
| 2006/0031340 A1* | 2/2006 | Mathew et al. | 709/206 |

* cited by examiner

Primary Examiner—Khanh Dinh
(74) Attorney, Agent, or Firm—George M. Macdonald; Angelo N. Chaclas

(57) ABSTRACT

A method and system for providing address change notification in an e-mail forwarding system by providing a pre-generated e-mail address change notification to recipients selected during registration in the e-mail forwarding system. The e-mail forwarding system operating when a message is received at an e-mail forwarding computer, the message identifying the first disfavored e-mail address. The e-mail forwarding computer parses the first e-mail address from the message to determine if there is a second preferred forwarding e-mail address associated with the first e-mail address. If there is a second e-mail address associated with the first e-mail address, the e-mail forwarding computer sends the e-mail message to a third computer associated with the second e-mail address.

12 Claims, 12 Drawing Sheets

Delivery Failure Report

Your document: Hello
was not delivered to: dquine@luv-npi.com
because: The specified address contains a host or domain name that could not be found by the Domain Name Server or local hosts file.

---

You might consider submitting this undeliverable message to the e-mail forwarding service at corrections @ emailangel.com.
To automatically submit this undeliverable message to the e-mail forwarding service press the "FIX" button to the right.

[ FIX ]

---

TO: DQuine@luv-npi.com

RE: Hello

I have not communicated with you in a long time - how is everything?

FIG. 5C

| Disfavored E-Mail Address | Forwarding E-mail Address |
|---|---|
| Doug@yahoo.com<br>Doug@hotmail.com<br>Doug@obsolete.com | Doug@current.com |
| Doug@obsolete.com | Doug@work.com<br>Doug@home.com<br>Doug@wireless.com |
| Doug@yahoo.com<br>Doug@hotmail.com<br>Doug@obsolete.com | Doug@work.com<br>Doug@home.com<br>Doug@wireless.com |

FIG. 6

METHOD FOR PROVIDING ADDRESS CHANGE NOTIFICATION IN AN ELECTRONIC MESSAGE FORWARDING SYSTEM

CROSS REFERENCE TO RELATED APPLICATIONS

This application is a Continuation of commonly owned, U.S. patent application Ser. No.: 09/994,357, filed Nov. 26, 2001 now U.S. Pat. No. 6,988,129, which is incorporated herein by reference in its entirety. This application is related to the following applications: Ser. 09/629,909, titled SYSTEM AND METHOD FOR FORWARDING ELECTRONIC MESSAGES, filed Jul. 31, 2000; Ser. 09/629,911, titled DYNAMIC ELECTRONIC FORWARDING SYSTEM, filed Jul. 31, 2000; Ser. 09/629,904, titled E-MAIL FORWARDING SYSTEM HAVING ARCHIVAL DATABASE, filed Jul. 31, 2000 now U.S. Pat. No. 6,832,246; Ser. 09/648,576, titled REMOTE E-MAIL FORWARDING SYSTEM, filed Aug. 28, 2000; Ser. 09/751,490, titled SYSTEM AND METHOD FOR CLEANSING ADDRESSES FOR ELECTRONIC MESSAGES, filed Dec. 28, 2000 now U.S. Pat. No. 6,839,738; Ser. 09/750,952, titled SYSTEM AND METHOD FOR CLEANSING ADDRESSES FOR ELECTRONIC MESSAGES, filed Dec. 28, 2000 now U.S. Pat. No. 6,895,427; and Ser. 09/920,059 titled SYSTEM AND METHOD FOR FORWARDING ELECTRONIC MESSAGES, filed Aug. 1,2001 now U.S. Pat. No. 6,957,248. The disclosures for each of the applications listed above are hereby expressly incorporated by reference.

FIELD OF THE INVENTION

The present invention relates to a system and method for providing address change notification to correspondents in connection with an e-mail forwarding system. The e-mail forwarding system forwards e-mail messages intended to be initially delivered to an obsolete or disfavored address to a chosen forwarding address associated with the obsolete or disfavored e-mail address.

BACKGROUND

Recent advances in telecommunications networks have drastically altered the manner in which people interact and conduct business. These advances promote efficiency and convenience in one's ability to receive important information. With this in mind, individuals and businesses today find that their physical and electronic addresses are changing faster than ever with increased mobility and competing message delivery services. Deregulation and privatization of the global postal systems, competing package delivery services, and rapid growth of multiple competing electronic mail (e-mail) systems are creating an environment in which there is no single point of contact for address correction as there was when the sole messaging provider was the national postal service.

Users who enjoy the benefit of sending and receiving e-mail messages typically subscribe to an Internet Service Provider (ISP) offering such e-mail capabilities (e.g., America Online (AOL), Netcom, and Redconnect) and/or may subscribe to an internet based e-mail service (e.g., juno, rocketmail, yahoo) which each is associated with a particular e-mail address. Thus, the e-mail address is unique to the e-mail service provider. The uniqueness of an address to a selected provider is often apparent on the face of the address, e.g., DQuine@aol.com, Quine@juno.com or DouglasQuine@yahoo.com. A user or subscriber to a particular e-mail service may from time to time desire or need to change service providers (e.g., from DQuine@aol.com to QuineDo@pb.com). Exemplary motivation for these changes may derive from the fact that an alternative service provider charges lower rates, or the existing provider's inability to upgrade its service.

A user who desires to change from one e-mail service provider to another suddenly faces the reality of being bound to the old service provider because the user's address is unique to that one provider. A sudden and complete changeover is in many circumstances impossible because the community of people who wish to send electronic messages to the user are only aware that the old address exists. For example, an e-mail address may be published in an industry directory that is only published once every year or two years. Alternatively, the e-mail address may be printed on a business card which cannot be retracted and corrected. Thus, the user incurs a potentially significant loss of prospective business by abandoning the old address.

Currently, there is no effective means in place for address correction of e-mail addresses. Even if the e-mail sender is highly diligent, there are no resources or processes available to identify corrected electronic address information. The problem is further accentuated by the fact that extreme competition in internet service providers, and likewise e-mail service providers, results in extremely high obsolesce of e-mail addresses with no means for e-mail forwarding (e.g., closing an AOL e-mail account provides no option for forwarding e-mail intended for that account to a new e-mail address).

Further, today's web savvy users may have multiple e-mail addresses which periodically change as new features develop or are lost. Entire domain names can be lost (e.g., lostdomain.com) and all mail directed there may be lost as well. In either case, typically the MAIL DAEMON message is returned to the sender, notifying the sender that the e-mail address cannot be found and e-mail message is being returned to the sender.

Some service providers offer their user-subscribers the option of a message forwarding service. These forwarding services operate by receiving the incoming message, retrieving the portion of the incoming message that identifies a selected user who subscribes to the forwarding service, associating the selected user with a forwarding address through the use of a lookup table, and transmitting the message to the forwarding address. The forwarding services differ from the normal message delivery service that the central service provider offers because a portion of the forwarding address belongs to another central service provider. Thus, the forwarded message is actually delivered to its intended recipient by the other or second service provider, i.e., the forwarded message passes through two central service providers, as opposed to just one provider. The intended message recipient is free to change the second provider with regularity provided that the recipient always informs the forwarding service of each change in the second provider. However, this message forwarding system only works with viable e-mail address, that is, the e-mail address associated with the first service provider must still be active and not obsolete. In fact, few e-mail services offer forwarding services and few, if any, offer to forward e-mail after the account is closed. Otherwise, the first service provider is only enabled to send the later mentioned MAIL DAEMON message back to the original sender of the e-mail message.

SUMMARY OF THE INVENTION

Accordingly, the present invention relates to a method and system for forwarding an e-mail message intended to be delivered to a disfavored e-mail address to an associated forwarding e-mail address. The present invention also provides a means to inform potential senders of e-mail that the e-mail address owner has changed his or her e-mail address, and to make the e-mail forwarding system more effective by recruiting more subscribers.

The preferred embodiment of the present invention will be utilized by an e-mail addressee who wishes to have e-mail forwarded from a disfavored/obsolete/defunct e-mail address to a forwarding e-mail address, for any of the reasons discussed above. Accordingly, the e-mail addressee must first become a subscriber to a service that provides the functionality of the present invention, as described further below. To become a subscriber the e-mail addressee must provide the e-mail forwarding service with the disfavored address from which e-mail is to be forwarded, and the new address to which the forwarded e-mail will be sent. In the preferred embodiment of the present invention, this transaction is handled via an INTERNET web page interface.

As an additional feature of the present invention, at the time a new subscriber is providing the information about the disfavored and forwarding e-mail addresses, the new subscriber will also be provided with a prompt offering the opportunity to send out a pre-generated form notification to immediately inform selected correspondents of the e-mail address change. By directly informing selected correspondents of the change, electronic messages from those selected correspondents may not be subject to the extra verifying steps and privacy features that are implemented in the e-mail forwarding portion of the present invention, as described below. Such a form notification can also inform the selected correspondents about the service provided by the present invention, which in turn may enhance the utility of the present invention by increasing the quantity of subscribers and e-mail addresses for which forwarding services can be performed.

To implement the present invention, a subscriber registers the disfavored and forwarding e-mail addresses with an e-mail forwarding computer, the e-mail forwarding computer having its own third e-mail address. The e-mail forwarding computer is programmable to associate the disfavored e-mail addresses with forwarding e-mail addresses.

In a first embodiment implementing the invention, undeliverable e-mail is returned to the sender and is then redirected to the e-mail forwarding computer, with a third e-mail address (or Internet address), for correction. In another embodiment, the mail servers or ISP routers serving the undeliverable mail may direct the undeliverable mail automatically to the e-mail forwarding computer, with a third e-mail address (or Internet address) for correction.

In the first embodiment, a message sending user sends an e-mail message to a first e-mail address. If the first e-mail address is obsolete, or otherwise undeliverable, the message is often returned to the user with an indication that it is undeliverable. When this e-mail message is returned to the user, the user resends the undeliverable e-mail, originally addressed to the first e-mail address, to a third e-mail address for a remote e-mail forwarding computer that is capable of forwarding the e-mail message to a second e-mail address. The forwarding computer receives the e-mail message and parses the first e-mail address from the e-mail message to determine if there is a second e-mail address associated with the first e-mail address. If there is a second e-mail address associated with the first e-mail address, the forwarding computer sends the e-mail message to the second associated e-mail address.

If the e-mail forwarding computer is unable to find a match for the disfavored e-mail address, it preferably stores in an archival database at least the disfavored e-mail address (and ideally also the sender's address, date, and message text). The forwarding computer then subsequently checks after new subscribers register for the services of the forwarding computer, and determines whether a forwarding e-mail address has been associated with the unmatched e-mail address. If there is such a match, the remote computer than sends at least a message to the forwarding address that a sender at a sender's e-mail address has attempted to send a message. Alternatively, the forwarding computer can send a message to the sender indicating that a forwarding address has not been associated with the previously unmatched undeliverable address.

As an alternative embodiment, rather than having the message sender forward the undeliverable e-mail to the forwarding computer. A domain owner for the domain identified in the undeliverable e-mail address may configure its e-mail server to automatically forward undeliverable mail items to the forwarding computer. For example, an ISP, such as AOL (owning aol.com), can assist in more efficiently delivering messages to the appropriate e-mail address by redirecting undeliverable messages to the third party registry of e-mail addresses and corresponding forwarding addresses included in the forwarding computer. Thus, the forwarding computer could serve as a neutral point of contact between competing ISPs, and the competing ISPs need not share any information with each other about their customers.

Thus, an advantage of the present invention is that there is little or no cooperation needed from the e-mail server associated with the disfavored e-mail address. That is, if an e-mail address becomes disfavored (it is no longer an active e-mail address) either because the associated e-mail server ceases to exist, or the e-mail account has been left abandoned for a host of reasons, the present invention e-mail forwarding system nevertheless operates. Also, the present invention can offer additional enhanced functionality by obtaining minimally invasive cooperation from the e-mail server associated with the disfavored e-mail address. An additional benefit is that when an e-mail message is forwarded by the present invention, the privacy of the recipient is protected because the e-mail sender of the e-mail message is preferably not notified of the recipient's forwarding address. The recipient may choose to whom he or she wishes to send the corrected e-mail address.

BRIEF DESCRIPTION OF THE DRAWINGS

The above and other objects and advantages of the present invention will become more readily apparent upon consideration of the following detailed description, taken in conjunction with accompanying drawings, in which like reference characters refer to like parts throughout the drawings and in which:

FIGS. 5A, 5B, and 5C depict e-mail messages illustrating the operability of the e-mail messaging system of FIG. 1.

FIG. 6 depicts a look-up table having dynamic parameters in accordance with the present invention;

DETAILED DESCRIPTION

Figure 1:
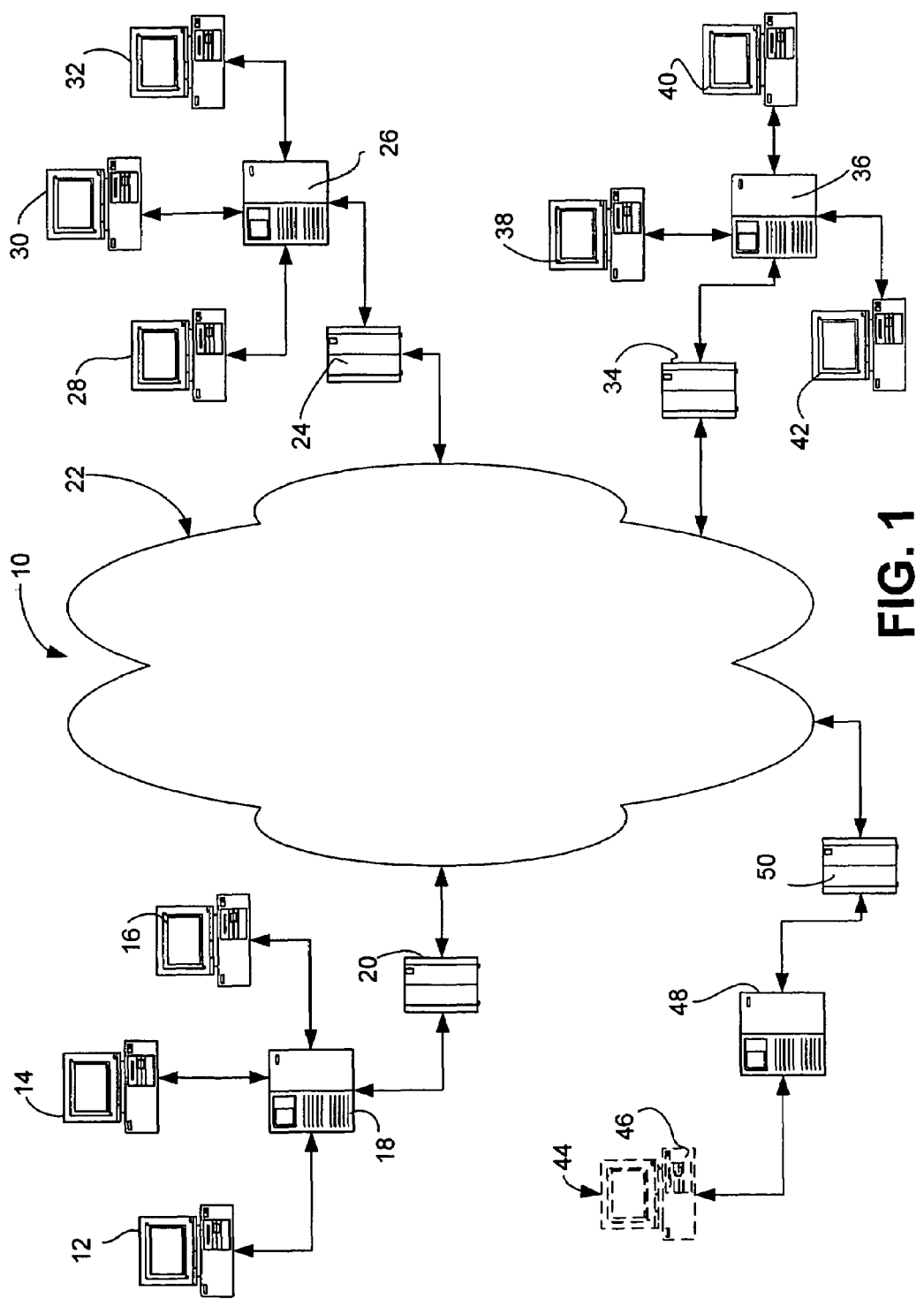
FIG. 1 depicts an electronic e-mail messaging system embodying the present invention.

FIG. 1 schematically depicts a conventional INTERNET telecommunications system 10. The FIG. 1 system is exemplary in nature. The present invention can be implemented as program control features on substantially all telecommunications service provider systems, and system 10 is intended to represent any operable telecommunications system that is used by any telecommunications service provider in conducting communication operations (e.g., facsimile, pager, mobile phone and PDA computers).

It is to be appreciated that the term "INTERNET" is well known in the art as designating a specific global international computer network that operates according to the TCP-IP protocol. A portion of the INTERNET receives or has in the past received funding from various United States governmental agencies including ARPA, NSF, NASA, and DOE. INTERNET communications protocols are promulgated by the Internet Engineering Task Force, according to standards that are currently set forth in RFC 1602.

Telecommunications system 10 includes a plurality of user or signal origination sites 12, 14 and 16, with each site being depicted in reference to a PC capable of generating and transmitting e-mail messages, wherein each site 12, 14 and 16 corresponds to a specific telecommunications address. A user may utilize one site or a plurality of sites. A single city or local service area may have millions of these signal origination sites. Each site 12, 14 and 16 corresponds to a telecommunication address that belongs to an individual, business, and other entity having need to avail themselves of telecommunications services.

It is to be understood that preferably each origination site 12, 14 and 16 feeds its signal (addressed to a subscriber identified at a selected service provider) to an internet service provider 18 (ISP), which in turn preferably feeds the signal to a local router node 20 that directs the local signal to a relay system, e.g., the INTERNET (conventionally depicted as a cloud) 22, which transmits the signal to a router 24 through a series of relays. The signal eventually arrives at an internet service provider 26 through router 24.

As can be seen in FIG. 1, a plurality of destination sites 28, 30, 32, 38, 40 and 42 are shown connected to internet service providers 26 and 36 with each site being depicted in reference to a PC capable of generating and transmitting e-mail messages, wherein each site corresponds to a specific telecommunications address. It is of course to be appreciated that telecommunications system 10 includes a plurality of routers (e.g., routers 24 and 34 with each internet service provider being connected to a plurality of user sites (e.g., PC's 38, 40 and 42). It should also be appreciated that internet service providers 18, 26, 36, and 48 may be a consumer subscription oriented ISPs, such as AOL, or an institutional e-mail communication service provided by a company to provide e-mail for employees.

In accordance with the present invention, telecommunications system 10 additional includes a messaging forwarding system 44, which as will be further discussed below, enables e-mail messages to be automatically forwarded to a forwarding address, which forwarding address is associated with a currently undeliverable e-mail address. Messaging forwarding system 44 preferably includes a PC 46 connected to an internet service provider 48, which PC 46 is provided with a unique e-mail address (corrections@emailangel.com) and software programmed to perform the below described steps necessary to operate the present invention e-mail forwarding system 44. PC 46 may have more than one unique e-mail address. The different addresses may connect to varying forwarding service that can be provided by forwarding system 44, and to receive different formats of submissions to forwarding system 44. Internet service provider 48 is preferably connected to INTERNET 22 via router 50. It will be understood by those skilled in the art that message forwarding system 44 may include any suitable computer processing device as an alternative to PC 46.

Figure 4:
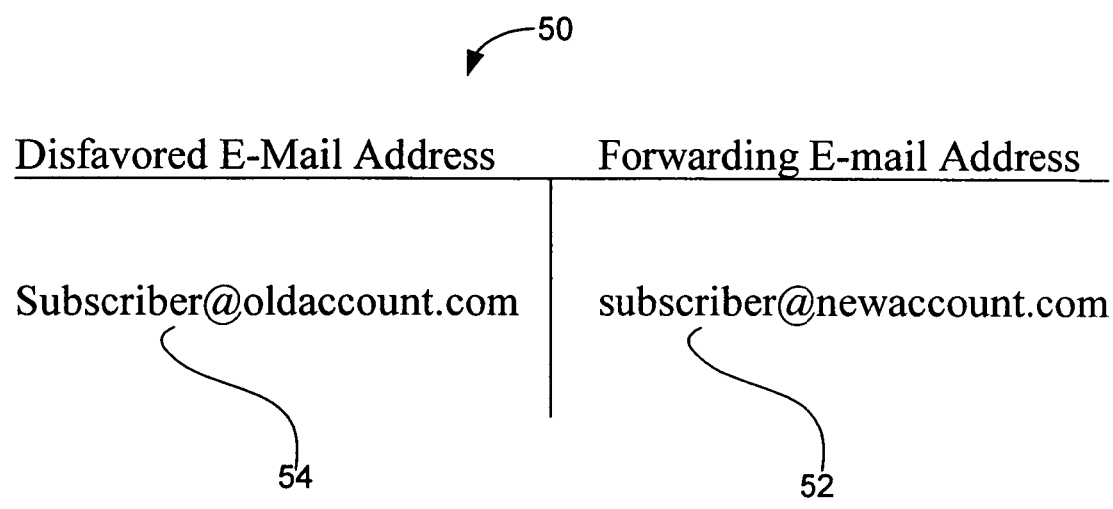
FIG. 4 depicts a look-up table used by the present invention.

As shown in FIG. 4, system 44 includes a software program that includes a look-up table 50, which is programmable to provide an e-mail forwarding address 52 associated with pre-programmed defunct (undeliverable) e-mail address[es] 54. It is to be appreciated that the look-up table 50 of system 44 may be accessed or programmed through any conventional known means, including via the internet 22 in which a user at PC site 28 accesses the look-up table 50 in system 44, via the internet 22, via routers 24 and 50, and internet service providers 26 and 48. Look-up table 50 may include a plurality of defunct subscriber addresses,(54+N), with each defunct address being associated with one or more forwarding addresses (52+M)

It is to be appreciated that in this description of the present invention system 44, mention is made to both a "user" and "subscriber" of system 44. It is to be understood that a "user" of system 44 refers to anyone who is capable of transmitting an e-mail message and accesses system 44 when it is desired to forward the message to a forwarding address, which forwarding address the user is unaware of. A user may also be referred to as a "sender" of an e-mail. A "subscriber" of system 44 refers to anyone who subscribes to the e-mail forwarding service of system 44 in which the subscriber registers both a defunct e-mail address 54 and at least one e-mail forwarding address 52 with system 44. A subscriber may also be referred to as a "recipient" of an e-mail using the present invention. E-mail forwarding system 44 is accessible by any user.

In illustration, if a subscriber of system 44 closes an e-mail account (e.g., user@oldaccount.com) for whatever reason, the subscriber may still desire to continue to receive messages sent to that address (e.g., user@oldaccount.com), but now wants to receive those messages at a different account (e.g., subscriber@newaccount.com). In the prior art, to accomplish this the subscriber had to resort to informing everyone who had the old e-mail address (e.g., user@oldaccount.com) of the new e-mail address (e.g., subscriber@newaccount.com). In accordance with the present invention, the subscriber accesses the subscriber's designated account in system 44, via any known means such as the internet, registers the defunct e-mail address (e.g., user@oldaccount.com) and associates it with a desired forwarding e-mail address (e.g., subscriber@newaccount.com). Thus when a sender of an e-mail desires to transmit a message to a subscriber of system 44 but only knows the subscriber's old e-mail address (e.g., user@oldaccount.com), which account is no longer active, the user now merely looks to system 44 to forward the message to an active account (e.g., subscriber@newaccount.com), as will be discussed further below.

Figure 7:
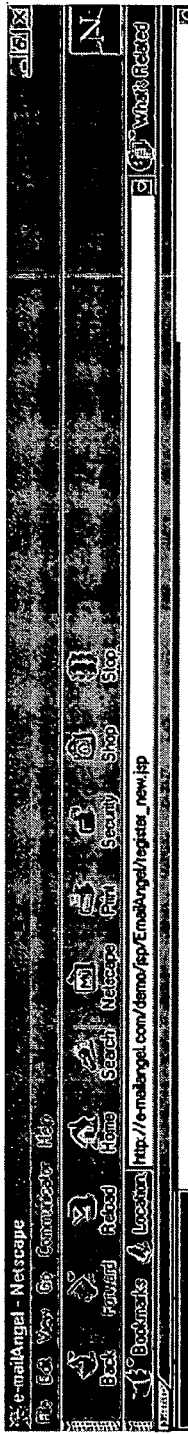
FIG. 7 depict a preferred INTERNET registration interface.

In the preferred embodiment, a new subscriber registers by providing the new e-mail address information and old e-mail address information via an INTERNET web page interface such as the one depicted in FIG. 7. The subscriber enters the new e-mail address to which forwarded messages will be sent in entry field 705. The subscriber may then identify one or more disfavored/defunct e-mail addresses in entry fields 706, of which there are six shown in the embodiment in FIG. 7. When all of the appropriate information has been entered into the fields, the subscriber then presses the "Register Me" button 707, to complete the transaction.

Figure 8A:
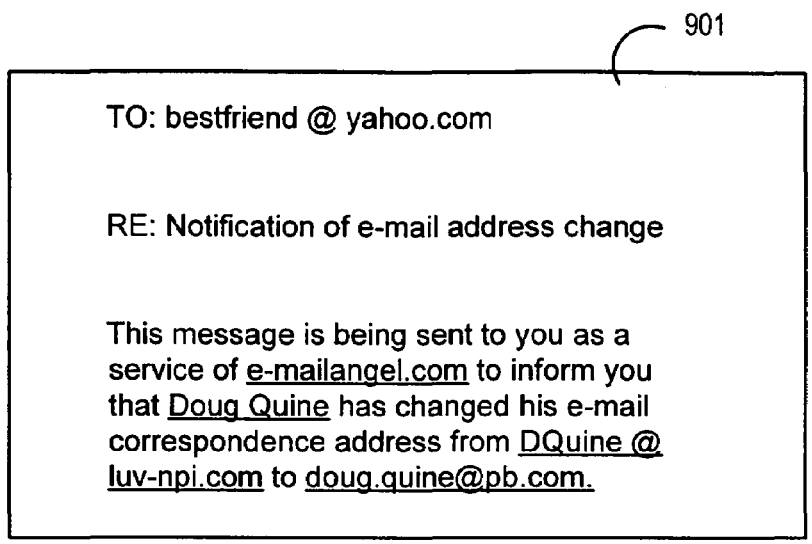
FIGS. 8A and 8B depict an exemplary e-mail address change notification messages.
Figure 9:
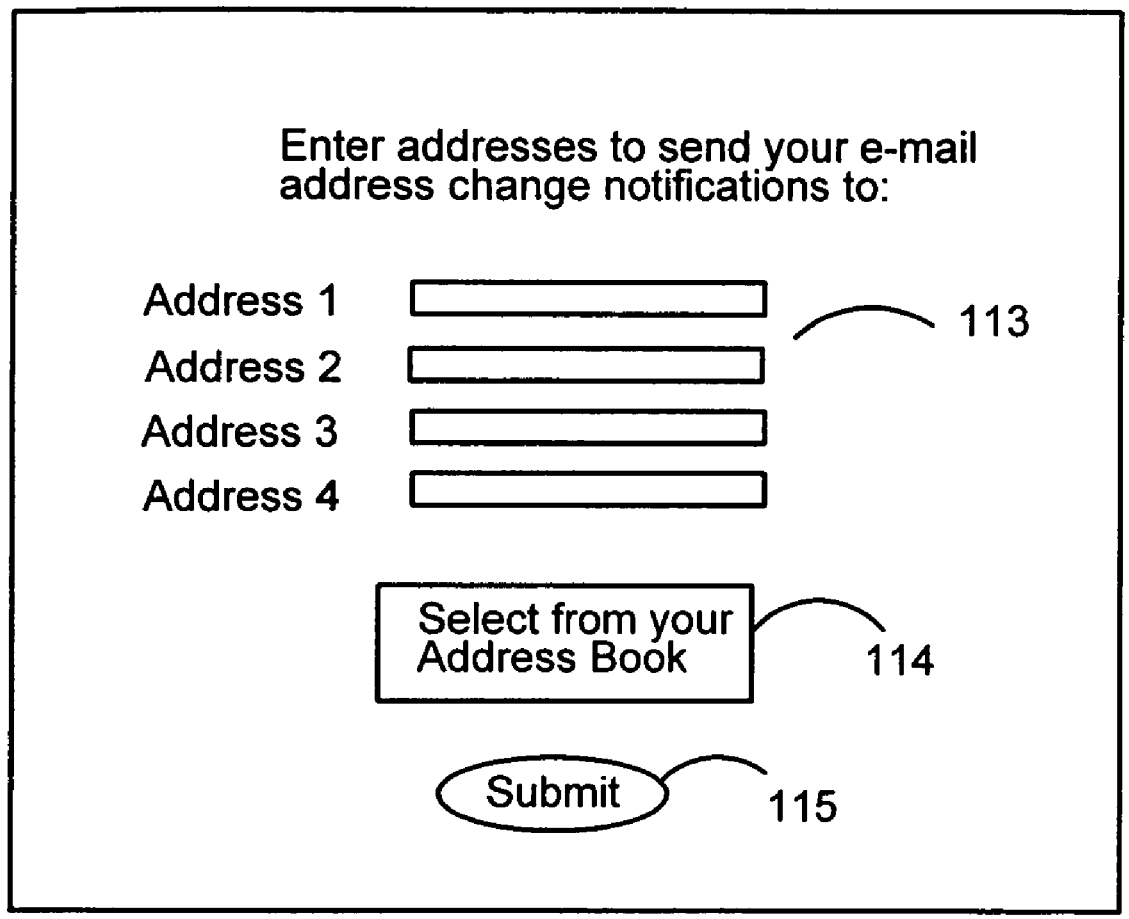
FIG. 9 depicts an exemplary address change notification recipient entry interface.

The registration process also includes a prompt offering the new subscriber an opportunity to send a pre-generated notification 901 (FIG. 8A) to selected correspondents notifying them of the change from the disfavored address to the new address. If the subscriber elects to send the pre-generated notifications 901, the user can enter the e-mail addresses for the selected recipients in fields on a further INTERNET web page interface depicted in FIG. 9. As shown in FIG. 9, the subscriber may enter a plurality of addresses for notification recipients in fields 113. Alternatively, recipients may be selected from the subscribers e-mail address book by pushing the "Select from you address book" button 114. When the user is finished identifying recipients for the notification 901, then the "submit" button 115 may be selected.

Preferably each selected recipient will receive a separate copy, or a blind copy, of the pre-generated notification, so as to maintain privacy between recipients, and to prevent a long list of recipients. By selecting button 114, the subscriber can is given the option of sending the notifications to all of the correspondents in the subscriber's e-mail address book, or notifications to different categories of recipients (friends, work colleagues, etc.).

Figure 8B:
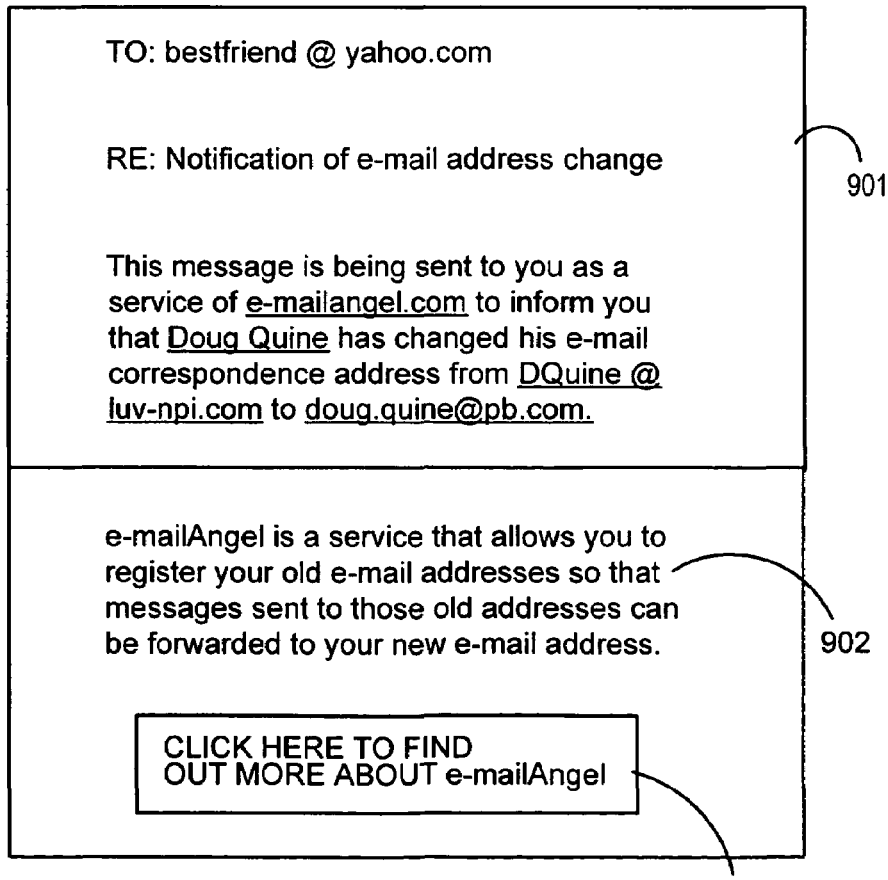

The notifications 901 to the selected correspondents preferably include an explanation 902 of the e-mail forwarding service provided in accordance with the present invention, and possibly include instructions on how to become a subscriber. Preferably the notification 901 will include a button or a hot link 903 to allow the recipient to easily access a registration interface, such as the one depicted in FIG. 8B. Preferably, prior to sending the notifications to the selected recipients, the e-mail forwarding system 44 will send a test message to the new subscriber to confirm that the new address is correct.

The pre-generated notifications 901 compliment the e-mail forwarding aspects of the present invention by allowing selected correspondents to have immediate access to the new e-mail address, while still providing the e-mail forwarding services, which includes privacy features and other advantages as described herein. The notifications 901 also serve to encourage more of the e-mailing public to subscribe to the service pursuant the present invention, thereby increasing the utility of the invention by increasing the chances that a given e-mail can be correctly forwarded to an appropriate recipient.

As indicated above, FIG. 1 is exemplary in nature, and those skilled in the art understand that equivalent substitutions of system components can be made. For example, electrical communications over conductive telephone lines, optical communications over optical fibers, radio communications, and microwave communications are substantially equivalent for purposes of the invention. Likewise, messages could be relayed through e-mail, facsimile, pager, PDA device or other capable communications system.

Figure 2:
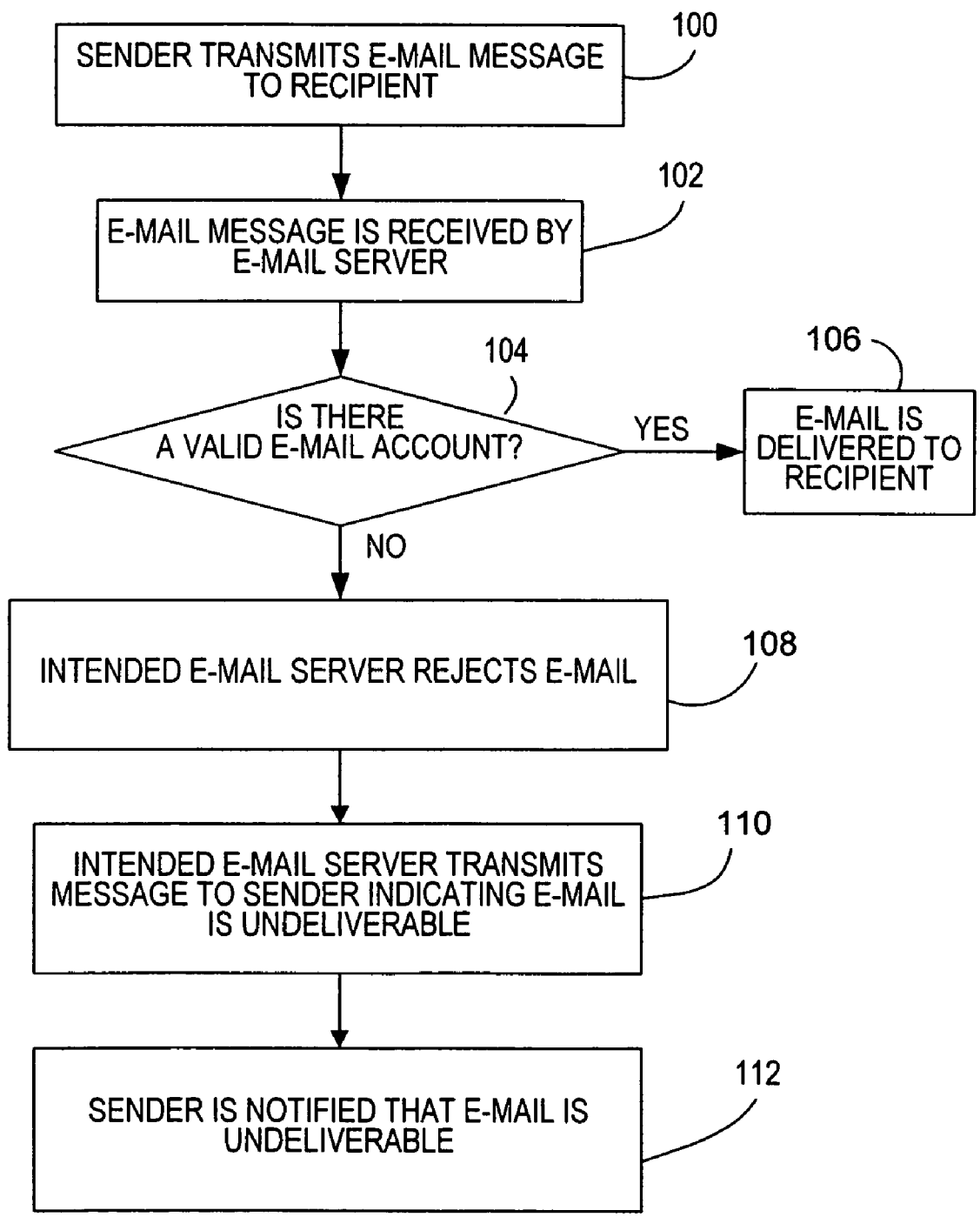
FIGS. 2 and 3 depict flowcharts depicting the e-mail forwarding operation of the present invention.
Figure 3:
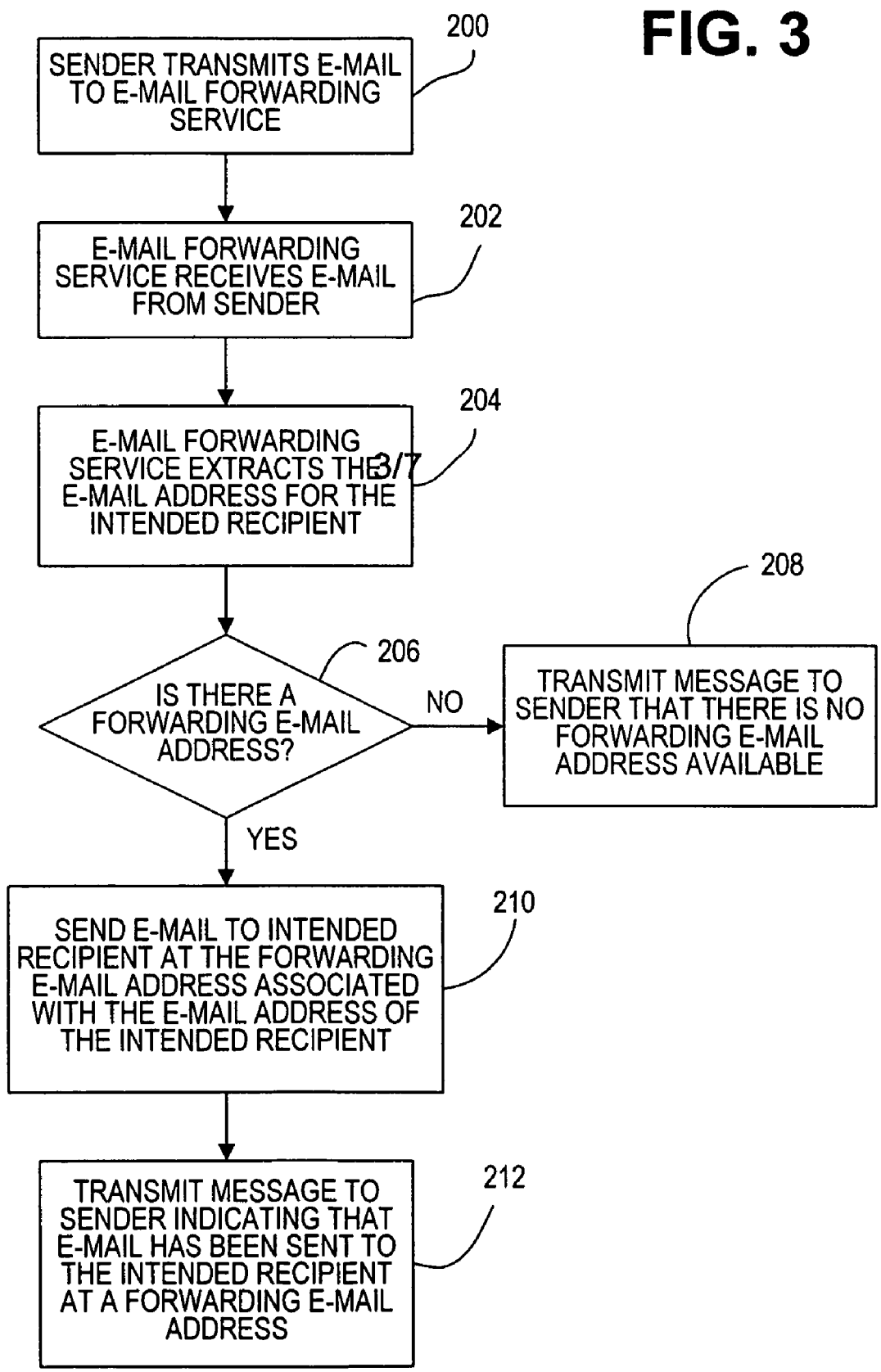
Figure 5A:
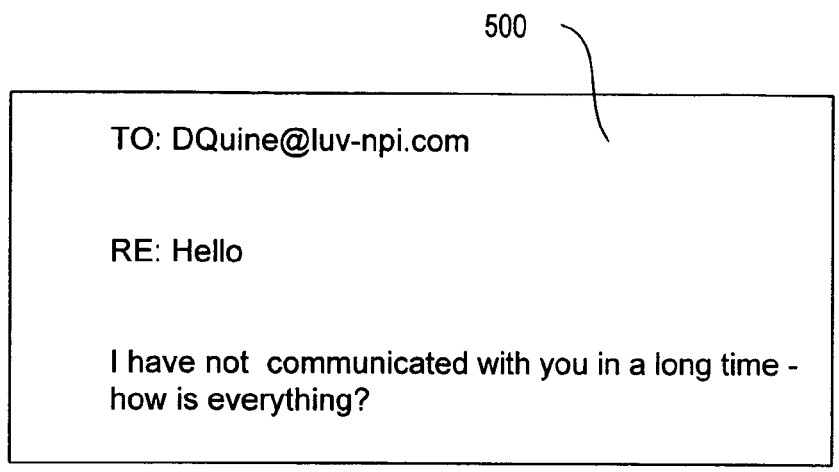

The method of use of system 44 will now be described with reference to FIGS. 2, 3 and 5 in conjunction with FIG. 1. Referring now to FIG. 2, when an email sender 14 desires to transmit a message to a recipient 30 having a known e-mail address (e.g., quine@luv-npi.com) of the recipient, the sender 14 transmits the e-mail message 500 (FIG. 5a) through conventional e-mail protocol, whereby the message is delivered to the identified mail server 26 (e.g., luv-npi.com) of the recipient 30, via the senders ISP server 18 (step 100). The recipient's 30 mail server 26 then receives the e-mail message (step 102), and if the e-mail account is valid (e.g., quine@luv-npi.com) (step 104), the e-mail message is then accessible to the view and thus considered delivered (step 106). If the account is not a valid account (e.g., quine@luv-npi.com) then the identified e-mail server 26 (e.g., luv-npi.com) rejects the request (step 108) and sends a MAIL-DAEMON message 510 (FIG. 5b) to the sender's 14 e-mail server 18 indicating that the message is not deliverable (step 110). The sender's e-mail server 18 then sends a message to the sender 14 that the attached e-mail message is undeliverable.

Since the sender 14 cannot contact the recipient (e.g., quine) via the now defunct e-mail address 54 (e.g., quine@luv-npi.com), the sender 14 is presented with the problem of how to contact the recipient. In order to overcome this problem, the present invention e-mail forwarding system 44 provides a solution by forwarding the e-mail message to a new address so long as the recipient 30 (e.g., quine) subscribes to the forwarding service of the system 44. In the current illustrative example, the recipient (e.g., quine) registers the defunct e-mail address 54 (e.g., quine@luv-npi.com) with the system 44 and instructs the system to forward all messages to a specified forwarding e-mail address 52 (e.g., quine@docsense.com), as depicted in the look-up table of FIG. 4.

In a preferred embodiment as shown in FIG. 5C, the returned MAIL DAEMON message 510 may further include a text message 511 suggesting that the user consider using an e-mail forwarding service, such as those of forwarding system 44, and provide information on how to submit the undeliverable message to the e-mail forwarding system 44.

Returning now to the sender's 14 situation in which the sender 14 still desires to transmit the e-mail message 500 but does not know the correct e-mail address. In accordance with the present invention, the sender 14 now forwards the entire message 510 that was previously sent to the intended recipient's defunct e-mail address (e.g., quine@luv-npi.com), and rejected, to the e-mail address (e.g., corrections@emailangel.com) assigned to the e-mail forwarding system 44 (step 200). The e-mail server 48 (e.g., emailangel.com) that received the message then informs the forwarding system 44 of the receipt of this message and afterwards the forwarding system 44 receives the message from the e-mail server 48 (step 202). The forwarding system 44 then parses message 510 and extracts the intended address for the recipient (e.g., quine@luv-npi.com) from the message (step 204). The forwarding service 44 then does a look-up in table 50 for the intended address (e.g., quine@luv-npi.com) to determine if this address has been registered by a subscriber in the forwarding system 44 (step 206). If no, system 44 sends an e-mail message back to the sender 14 informing the sender 14 that the defunct address of the recipient 30 (e.g., quine@luv-npi.com) is not registered with the forwarding system 44 (step 208). If yes, forwarding system 44, sends the e-mail message 510 addressed to the recipients defunct address 54 (e.g., quine@luv-npi.com) to the recipient subscriber's new e-mail address 52 (e.g., quine@docsense.com) as prescribed in the look-up table 50 of the forwarding system 44. Preferably, forwarding system 44 then sends an e-mail to the sender 14 indicating that the message original addressed to a defunct e-mail address has now been properly forwarded. As will be discussed further herein, the forwarding service 44 may also hold, or offer to hold, a copy of the message for later delivery if the recipient subsequently registers for the forwarding system 44.

In a preferred embodiment, as shown in FIG. 5C, the returned undeliverable message 510 may include a link or a button 512 which the user can activate to automatically transmit the undeliverable e-mail to forwarding system 44. Such a link or button 512 may include a designation such as "FIX" or "SUBMIT TO FORWARDING SERVICE." Such a link or button 512 may be added into message 510 by using an hyperlink, a Java applet, or any conventional linking mechanism. The link or button 512 may be included in message 510 by the ISP that returns the undeliverable message, or it may be included as an option in the user's e-mail browsing program that becomes available when an undeliverable message is received. The link or button 52 can be a downloaded applet to be run with the user's e-mail application software. For purposes of this embodiment, any kind of link or button may be interchangeable for providing a convenient way for a user to access the service of the e-mail forwarding system 44.

Figure 5B:
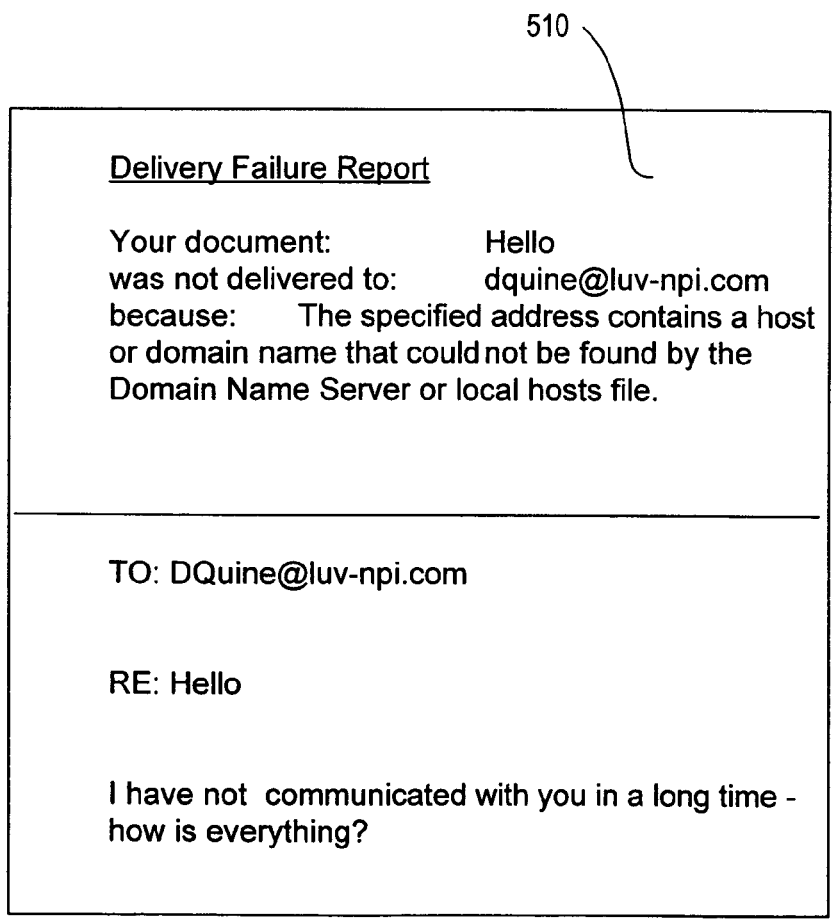

In addition to the form of the message 510 specifically shown in FIGS. 5B and 5C, the message from the user to the forwarding computer may take a variety of forms. As an alternative to forwarding the message returned by the MAIL DAEMON, message 510 can be a forwarded copy of the of the original message 500, or a new message indicating the undeliverable address in the subject line. Message 510 can alternatively be a new message that includes information identifying the rejected e-mail address and a desired message, possibly differing from the message in the original rejected e-mail. Such a new message might be composed using a predetermined template specifically designed to interact with forwarding system 44.

As a further alternative for submitting a message 510 to the forwarding system 44, an INTERNET web page could be used for submitting rejected e-mail addresses and messages. In such an INTERNET embodiment, the user could access a web page that included input fields into which the user could enter an e-mail address for which a forwarding address was desired, as well as any message to be forwarded. The information entered by the user at the web page could then be sent to the forwarding system 44.

Thus, a clear advantage of the present invention e-mail forwarding system 44 is that a sender merely forward a rejected e-mail message to the e-mail address (e.g., corrections@emailangel.com) associated with the forwarding system 44 to determine if the previously rejected message can be forwarded to a proper e-mail address. And if it can, the forwarding system automatically forwards the message to an e-mail address as prescribed by the recipient. Thus, a user of system merely has to forward a rejected e-mail message to forwarding system 44 to utilize its forwarding services. Therefore, no internet access is required, only access to an e-mail server is required which is quite advantageous since many e-mail users only have access to an e-mail server and not an internet server, such as staff employees in corporations and home users who utilize free, or inexpensive e-mail services. Furthermore, in contrast to directory services, the system design preserves recipient privacy by not providing the new e-mail address to the sender.

In an alternative embodiment of the present invention, the look-up table of the e-mail forwarding system 44 may preferably have dynamic parameters in which a subscriber of system may have an account including one or more disfavored e-mail addresses that are associated with one or more forwarding e-mail addresses. For example, and with reference to FIG. 6, look-up table 60 is shown having three subscriber accounts 62, 64 and 66. In account 62, a subscriber is shown to have listed three disfavored e-mail addresses (e.g., doug@yahoo.com, doug@hotmail.com and doug@obsolete.com) in association with a single forwarding e-mail address (e.g., doug@current.com). Thus, when a user of system 44 uses it to forward e-mail to anyone of the listed disfavored e-mail addresses (e.g., doug@yahoo.com, doug@hotmail.com and doug@obsolete.com) the system 44 automatically forwards the e-mail to the single prescribed forwarding e-mail address (e.g., doug@current.com) regardless of which one the disfavored e-mail addresses (e.g., doug@yahoo.com, doug@hotmail.com and doug@obsolete.com) the e-mail message was intended for.

With reference to account 64, a subscriber is shown to have listed a single disfavored e-mail address (e.g., doug@obsolete.com) in association with three forwarding e-mail addresses (e.g., doug@work.com, doug@home.com and doug@wireless.com). Now, when a user of system 44 uses it to forward e-mail intended for the listed single disfavored e-mail address (e.g., doug@obsolete.com), the system 44 automatically forwards the e-mail message to each one of the prescribed e-mail addresses (e.g., doug@work.com, doug@home.com and doug@wireless.com).

Referring now to account 66, a subscriber is shown to have listed three disfavored e-mail addresses (e.g., doug@yahoo.com, doug@hotmail.com and doug@obsolete.com) in association with three forwarding e-mail addresses (e.g., doug@work.com, doug@home.com and doug@wireless.com). Thus, when a user of system 44 uses it to forward e-mail to anyone of the listed disfavored e-mail addresses (e.g., doug@yahoo.com, doug@hotmail.com and doug@obsolete.com), the system 44 automatically forwards the e-mail message to each one of the prescribed e-mail addresses (e.g., doug@work.com, doug@home.com and doug@wireless.com).

Of course it is to be appreciated that a subscriber of system 44 may maintain multiple accounts whereby a single subscriber may maintain each of the previous described accounts 62, 64 and 66.

In another embodiment of the present invention, the e-mail forwarding system may be configured to include an archival database of unsuccessful requests for forwarding undeliverable e-mail messages. As was discussed above in reference to FIG. 3, when the e-mail system 44 determines that there is no e-mail forwarding address in its look-up table 60 for a disfavored e-mail address (step 206), a notice is sent to the user indicating the non-inclusion of an e-mail forwarding address and thus the e-mail message was not forwarded (step 208). One probable reason for this situation is that the owner of the disfavored e-mail address never subscribed to e-mail forwarding services of system 44. Thus, even if this owner shortly thereafter subscribes to the e-mail forwarding services of system 44, the owner is never informed of this previous request and may consequently not receive e-mail messages of possible significance to the subscriber.

However, this problem is solved by providing an archival database in the e-mail forwarding system 44, which database preferably stores parameters of unsuccessful requests for forwarding e-mail messages. Such parameters may include any of those contained in the exemplary e-mail message of FIG. 5b as transmitted by a user to the e-mail forwarding system 44 (e.g., To:Dquine@luv-npi.com and ChrisC@PB.com). Alternatively, the archival database may contain all the parameters contained in the (e-mail message of FIG. 5B). The sender is advised that there is no current registration available for this address but that the message may be held pending a future registration at which time the message will be released to the recipient. The sender is given the option of allowing the message to remain pending or the option of withdrawing the message at any time before it is delivered (e.g. press reply on this message to cancel message delivery). This allows the sender to withdraw a message if it becomes obsolete or moot.

Figure 10:
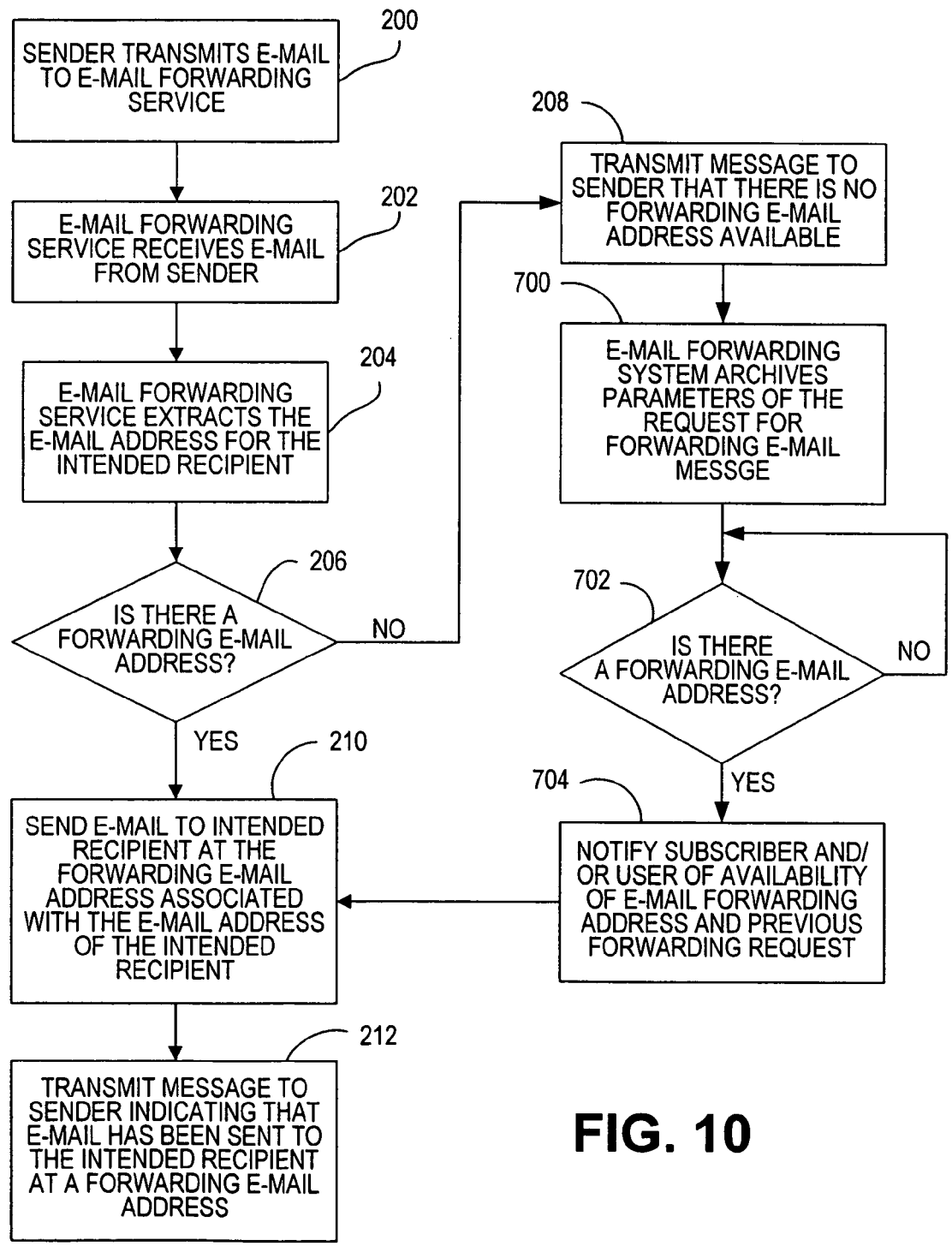
FIG. 10 a flow chart illustrating the steps taken by the present invention e-mail forwarding system for archiving requests for forwarding undeliverable e-mail.

With reference now to FIG. 10, after there has been a determination that there is no forwarding e-mail address (step 208), the e-mail forwarding system 44 archives parameters of the disfavored e-mail message preferably in a database implemented in the e-mail forwarding system 44 (step 800). Next, after each subscriber registers a disfavored e-mail address with system 44, system 44 checks its aforesaid archival database to determine if there is a match between a newly registered disfavored e-mail address and an archived disfavored e-mail address (step 802). If yes (step 804), system 44 notifies the subscriber that there was already a previous request by a user of the system 44 to forward e-mail to the newly registered disfavored e-mail address. System 44 may preferably notify the subscriber of the requesting user's e-mail address as well as the message that was attempted to be forwarded.

Alternatively, if there is such a match, system 44 may notify the requester, via e-mail, that a forwarding e-mail address has now been registered with the system that matches a previous request of the user and the user should once again use the services of system 44 to now successfully forward the e-mail message from a disfavored e-mail address to a forwarding e-mail address. This is advantageous in that only a minimal amount of information needs to be stored in the archival database. Also, it gives the user the option of forwarding a message since a message may become moot after the passage of a certain amount of time and thus the user may not want to forward such a message to the newly registered disfavored e-mail address.

If there is no match for a particular new subscriber, system waits again for a newly disfavored e-mail address to make the determination for a match between a newly registered disfavored e-mail address and those stored in the archival database (step 802).

Alternatively, the system 44 may be configured to make the determination for matches for newly registered disfavored e-mail address[es] and those stored in the archival database after a passage of a prescribed period of time (e.g., every: hour, day, week, month . . . etc.) and thus does not have to make such a determination each time a newly disfavored e-mail address is registered with the system 44.

In another alternative embodiment, the new registration need not identify a disfavored address or a corresponding forwarding address. Undeliverable e-mail sent to a previously non-existent address can be automatically held. Then when the new address is created and registered with the e-mail forwarding system 44, then the e-mail forwarding system can check to see whether there are any pending messages being held for the previously non-existent address. Such an arrangement may be used in a situation where an organization such as a corporation registers all of the e-mail accounts under its control, and e-mail addresses for new employees may be registered, even there is no disfavored address or forwarding address. As was noted previously, when a new employee joins a company there is often a delay before an e-mail account can me opened. During the delay period, people who are aware of the new employee may attempt to send e-mail messages. Where previously those premature messages might have been lost, under the current embodiment, those messages sent to the previously non-existent account can be archived and then forwarded to the new employee when the account is activated and registered.

Figure 11:
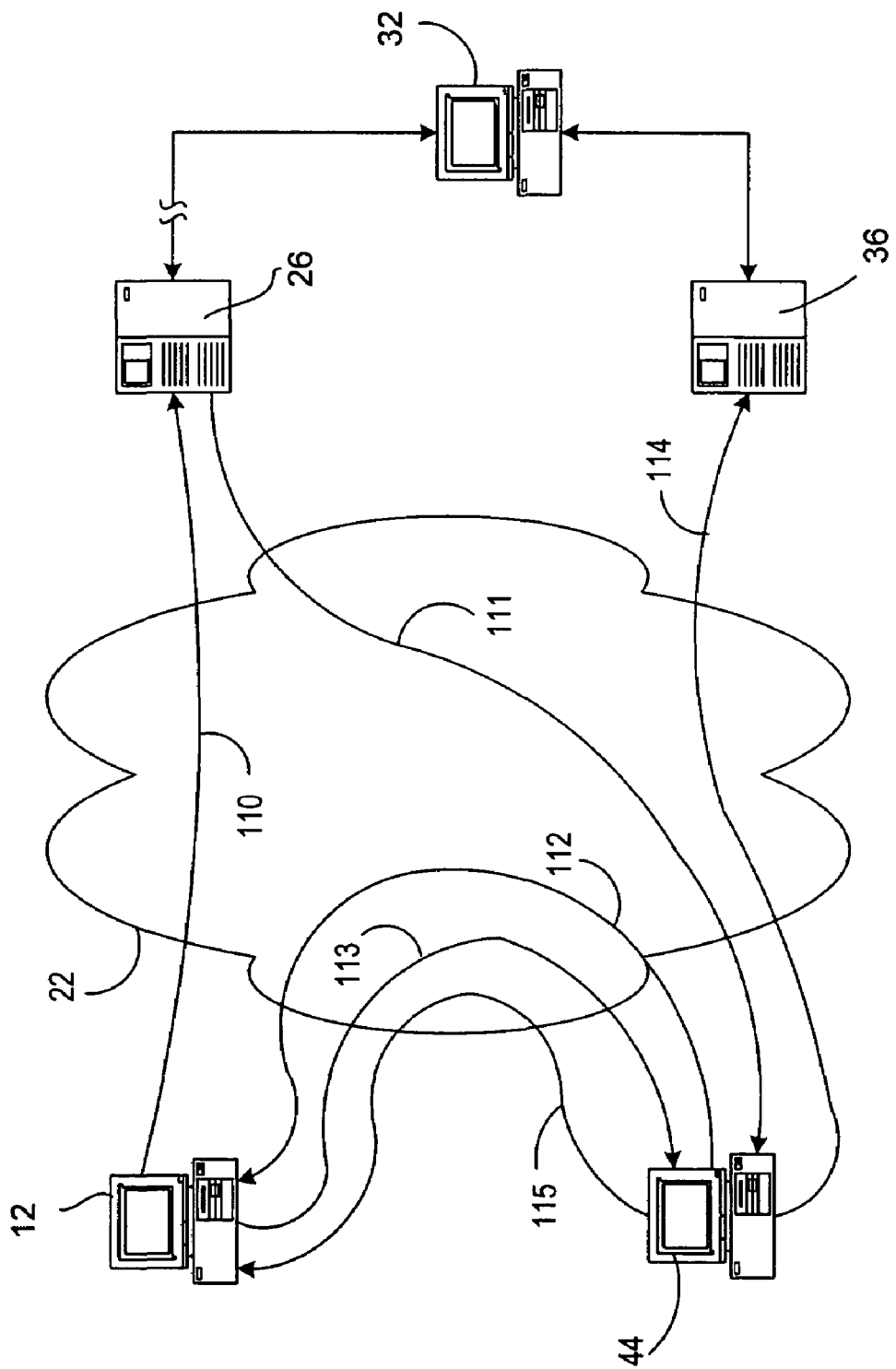
FIG. 11 depicts an embodiment for automatic directing of undeliverable messages to the e-mail forwarding system.

In another embodiment of the invention, the server associated with the undeliverable e-mail address automatically sends the undeliverable e-mail to the forwarding system 44. To illustrate this embodiment, FIG. 11 depicts a variation of the system shown in FIG. 1. In FIG. 11, routers 20, 24, 34 and 50 and internet service providers 18 and 48 are not shown for convenience, but may nevertheless be present in the embodiment described in this section. Arrows 110-115 depict conceptual paths of various communications at different stages of the embodiment described below. FIG. 11 also varies from FIG. 1 in that destination site 32 no longer has a valid e-mail address associated with ISP 26, as depicted by the broken line between the two. Instead destination site 32 has become associated with a different ISP 36 for which it has a new e-mail address. In accordance with the present invention, the owner of destination site 32 has registered with the forwarding system 44 to associate the now defunct e-mail address for ISP 26 to the new e-mail address at ISP 36.

As shown in FIG. 11, a user at originating site 12 sends, via path 110, an e-mail intended for the recipient at destination site 32 but that is addressed to the old defunct address at ISP 26. In accordance with the present embodiment, the e-mail server protocols at ISP 26 are modified to forward the undeliverable e-mail message to forwarding system 44 via path 111.

As a further optional variation of this embodiment, the e-mail originated at the originating site 12 may include a flag indicating whether or not the user wishes to have the message automatically forwarded to the forwarding system 44 if the address turns out to be undeliverable. The protocols of ISP 26 can be modified to check the flag when the e-mail is undeliverable, to determine the sender's preference, and to forward or return the e-mail accordingly. The modification to the protocols of ISP 26 may take a similar form to the known modification to implement delivery confirmation functionality when e-mail includes a flag indicating the delivery confirmation is desired.

Once the undeliverable message has been sent to the forwarding system 44, the forwarding system operates as described herein to determine whether there is a forwarding address associated with the undeliverable e-mail. If there is an associated forwarding address, then the forwarding system 44 can send the e-mail to the appropriate address via path 114.

However, in the preferred embodiment of the invention, the forwarding system 44 first communicates with the sender at originating site 12 via path 112 informing the user whether a forwarding address has been identified. If a forwarding address has been found, the user may communicate via path 113 back to the forwarding system 44 indicating whether or not the sender desires to have the message forwarded. Forwarding system 44 is programmed such that if the user indicates that the e-mail should be forwarded then the e-mail is forwarded to the new address via path 114. Finally, a confirmation of the activities of forwarding system 44 with regard to the subject e-mail can sent back to the user via path 115.

It should be noted that in this embodiment, and in any other embodiment, it is not necessary that ISP 26 and ISP 36 be different physical servers. The invention is equally applicable to the situation where the new forwarding address is associated with a disfavored address with the same ISP. For example, the forwarding system 44 could act to associate a forwarding address, such as quinedo@pb.com, that was associated with a disfavored address, such as Douglas.quine@pb.com, both addresses being served by the Pitney Bowes company e-mail server.

In summary, an e-mail forwarding system having a dedicated e-mail address for automatically forwarding e-mail has been described. Although the present invention has been described with emphasis on particular embodiments, it should be understood that the figures are for illustration of the exemplary embodiment of the invention and should not be taken as limitations or thought to be the only means of carrying out the invention. Further, it is contemplated that many changes and modifications may be made to the invention without departing from the scope and spirit of the invention as disclosed.

What is claimed is:

1. A method for providing notification of an e-mail address change and forwarding messages to forwarding e-mail addresses, the method comprising the steps of:
   registering a plurality of subscribers for an e-mail forwarding service, the step of registering comprising:
   identifying disfavored e-mail addresses of the subscribers;
   identifying forwarding e-mail addresses of the subscribers;
   identifying one or more e-mail address change notification recipients;
   sending a pre-generated e-mail address change notification to the identified one or more e-mail address change notification recipients; and
   providing a description of the e-mail forwarding service in the pre-generated e-mail address change notification;
   associating the disfavored e-mail addresses with the corresponding forwarding e-mail addresses in an e-mail forwarding computer;
   providing an electronic address for receiving messages at the e-mail forwarding computer, said messages relating to any of the plurality of disfavored e-mail addresses;
   receiving said messages at the electronic address;
   identifying, with the e-mail forwarding computer, a disfavored e-mail address in a received message, the disfavored e-mail address being other than the electronic address for the e-mail forwarding computer;
   determining, with the e-mail forwarding computer, a forwarding e-mail address associated with the disfavored e-mail address; and
   forwarding at least a portion of the received message from the e-mail forwarding computer to the associated forwarding e-mail address.

2. The method as recited in claim 1 wherein the step of registering further comprises providing a link to a subscriber registration interface in the pre-generated e-mail address change notification.

3. The method as recited in claim 1 wherein the step of identifying one or more e-mail address change notification recipients further comprises selecting recipients from subscribers' e-mail address books.

4. The method as recited in claim 1 wherein prior to the step of sending a pre-generated e-mail address change notification there is a step of sending a test message to confirm that the forwarding e-mail address is correct.

5. A method for providing notification of an e-mail address change and forwarding messages to forwarding e-mail addresses, the method comprising the steps of:
   registering a plurality of subscribers for an e-mail forwarding service, the step of registering comprising:
   identifying disfavored e-mail addresses of the subscribers;
   identifying forwarding e-mail addresses of the subscribers;
   identifying one or more e-mail address change notification recipients;
   sending a pre-generated e-mail address change notification to the identified one or more e-mail address change notification recipients; and
   providing a description of the e-mail forwarding service in the pre-generated e-mail address change notification;
   associating the disfavored e-mail addresses with the corresponding forwarding e-mail addresses in an e-mail forwarding computer;
   providing an electronic address for receiving messages at the e-mail forwarding computer, said messages relating to any of the plurality of disfavored e-mail addresses;
   receiving said messages at the electronic address;
   identifying, with the e-mail forwarding computer, a disfavored e-mail address in a received message, the disfavored e-mail address being other than the electronic address for the e-mail forwarding computer;
   determining, with the e-mail forwarding computer, a forwarding e-mail address associated with the disfavored e-mail address;
   forwarding at least a portion of the received message from the e-mail forwarding computer to the associated forwarding e-mail address; and
   sending a message including confirmation data relating to the forwarding of the received message.

6. The method as recited in claim 5 wherein the step of registering further comprises providing a link to a subscriber registration interface in the pre-generated e-mail address change notification.

7. The method as recited in claim 5 wherein the step of identifying one or more e-mail address change notification recipients further comprises selecting recipients from subscribers' e-mail address books.

8. The method as recited in claim 5 wherein prior to the step of sending a pre-generated e-mail address change notification there is a step of sending a test message to confirm that the forwarding e-mail address is correct.

9. A method for providing notification of an e-mail address change and forwarding messages to forwarding e-mail addresses, the method comprising the steps of:
   registering a plurality of subscribers for an e-mail forwarding service, the step of registering comprising:
   identifying disfavored e-mail addresses of the subscribers;
   identifying forwarding e-mail addresses of the subscribers;
   identifying one or more e-mail address change notification recipients;

sending a pre-generated e-mail address change notification to the identified one or more e-mail address change notification recipients; and providing a description of the e-mail forwarding service in the pre-generated e-mail address change notification;

associating the disfavored e-mail addresses with the corresponding forwarding e-mail addresses in an e-mail forwarding computer;

providing an electronic address for receiving messages at the e-mail forwarding computer, said messages relating to any of the plurality of disfavored e-mail addresses;

receiving said messages at the electronic address;

identifying, with the e-mail forwarding computer, a disfavored e-mail address in a received message, the disfavored e-mail address being other than the electronic address for the e-mail forwarding computer;

determining, with the e-mail forwarding computer, a forwarding e-mail address associated with the disfavored e-mail address;

requesting permission to forward the received message from the sender; and if permission is received, forwarding at least a portion of the received message from the e-mail forwarding computer to the associated forwarding e-mail address.

10. The method as recited in claim 9 wherein the step of registering further comprises providing a link to a subscriber registration interface in the pre-generated e-mail address change notification.

11. The method as recited in claim 9 wherein the step of identifying one or more e-mail address change notification recipients further comprises selecting recipients from subscribers' e-mail address books.

12. The method as recited in claim 9 wherein prior to the step of sending a pre-generated e-mail address change notification there is a step of sending a test message to confirm that the forwarding e-mail address is correct.

* * * * *